March 13, 1962 FRITZ STEINER ALSO KNOWN AS FRIEDRICH STEINER 3,025,522

DOPPLER-TYPE DIRECTION-FINDER

Filed April 14, 1959 4 Sheets-Sheet 1

INVENTOR.
F. Steiner
BY

INVENTOR.
F. Steiner
BY

INVENTOR.
F. Steiner
BY R. F. Morris

INVENTOR.
F. Steiner
BY R. P. Morris 3,025,522

DOPPLER-TYPE DIRECTION-FINDER

Fritz Steiner, also known as Friedrich Steiner, Pforzheim, Germany, assignor to International Standard Electric Corporation, New York, N.Y., a corporation of Delaware Filed Apr. 14, 1959, Ser. No. 806,327
Claims priority, application Germany Apr. 29, 1958
3 Claims. (Cl. 343—113)

This invention relates to Doppler-type direction-finders in which the frequency modulation of the incoming wave, which is caused by the simulated circular motion of an individual antenna, is utilized for the direction determination purpose. Direction-finding systems of this type are already well known, and examples of these techniques have already been proposed according to the prior art.

The fundamental considerations relating to direction-finders are also applicable to radio beacons.

The susceptibility to interference in the case of a multipath propagation of the incoming wave, which when compared with a normal type of Adcock direction-finder, decreases in a Doppler-type direction-finding system inversely to the ratio of the diameter of the antenna circle to the wavelength, i.e. by the factor 3. Accordingly, with the aid of the relationship $D/\lambda$, it will be possible to define a factor of improvement of the antenna system, by simply writing:

$$\gamma=3\times D/\lambda$$

Normally, the motion of an individual antenna on a circuit, which is effected by the successive connection of individual antennas, can only be simulated when the distance between two adjacent antennas is not greater than $\lambda/2$. At this value, phase-steps of 180° will occur when switching over from antenna to antenna, which will cause the amplitude of the carrier wave to become null. But when adjacent aerial spacing exceeds $\lambda/2$, a phase-reversal of bearing indication will result. In order to avoid phase-steps of 180° which result in the case of an interference field produced by multi-path propagation, the distance from one antenna to the next antenna is so chosen as not to exceed $\lambda/3$. From the factor of improvement which is desired for the arrangement of antennas, and from considering the above conditons, there may be set as a rule of thumb the following relationship for the necessary number of antennas ($n$), namely $n\cong 3\gamma$.

With an antenna arrangement as described above, a wider frequency range may be scanned if the selection of the spacing between the individual antennas should be made with respect to the highest frequency in question, or with respect to the shortest wavelength. However, since the factor of improvement $\gamma$ increases with $D/\lambda$, it will be decreased in the case of a constant diameter D, as the frequency becomes lower or as the wavelength becomes greater. In the case of a frequency range between 100 and 400 mc., the factor of improvement for the highest frequency (400 mc.) would be 10, and the number of antennas $n$ would be equal to 30. In the case of a frequency of 100 mc. the factor $\gamma$ would be equal to 2.5. However, this value is regarded as being insufficient for a Doppler-type direction-finder having the desired properties.

On the other hand, if there would be chosen a factor of improvement of $\gamma=10$ in the case of a frequency of 100 mc. then, in the case of a frequency of 400 mc. there would be the factor of improvement $\gamma=40$. This value of $\gamma=40$, however, is not at all necessary in the case of a frequency of 400 mc. In addition thereto, and in accordance with the given rule of thumb, the number of antennas $n$ would have to amount to 120, which would be far too great.

For this reason, efforts have been made for some time to find ways and possibilities for using larger antenna circle diameters with less number of antennas.

In the method of differential measurement of phase, one way of solving this problem has been mentioned in the literature (The Institution of Electrical Engineers, Paper No. 2549 "The Practical Evolution of the Commutated Aerial Direction Finding System"). Instead of using the first phase difference between the voltages delivered by the individual antennas, there is used the second phase difference for obtaining the bearing signal by means of a phase demodulation in this method.

In the conventional type of phase difference direction-finding system the double difference formation is effected in the intermediate frequency by a repeated mixing and by a later retardation in two delay lines or other types of retardation elements.

This method is very complex and unsuitable for employment with the Doppler principle, wherein direction-finding is not effected or carried out by the evaluation of a phase modulation, but by the evaluation of a frequency modulation.

It should be pointed out in this connection that these two kinds of direction-finding systems, namely the phase difference direction-finder and the Doppler-type direction-finder represent two different types of systems even though phase and frequency modulation, are mathematically linked to each other by the differential quotient. However, phase modulation differs completely from frequency modulation insofar as with the one there exists a fixed carrier wave, which is phase-modulated, while with the other one there does not exist a fixed carrier wave, but a high-frequency voltage which is variable with respect to its frequency.

These facts have to be taken into account when considering the direction-finding evaluation method according to the present invention.

The present invention is based on the problem of performing a reliable direction-finding operation with an antenna system, having a circular array of antennas, a given distance between the individual antenna elements, and operating on the Doppler principle, within a very wide frequency range. In other words, this invention will utilize as few antennas as possible within the circular array, and which will operate in a wide frequency range. Adjacent aerial spacing between individual antenna elements may lie near half the operating wavelength frequency of the received signal without disturbing the direction-finding accuracy of the system.

According to the present invention, this is accomplished in that the low-frequency bearing waveform which is derived from the normal frequency discriminator of a frequency-demodulating receiver, and containing the bearing signal, is subjected to an electric differentiation process. By this process the considerable wide phase steps are rendered ineffective to the evaluation of the bearing signal, whereby the ambiguity of the bearing indication is eliminated when the mutual distance between antenna elements is in excess of the critical value of $\lambda/2$.

The following invention will now be described in particular with reference to FIGS. 1–5 of the accompanying drawings, in which.

Referring now to FIGS. 1 to 5, a number of antennas 1–7 is arranged on a straight line at a spaced relation *d*. The wavefront is coming-in from the direction E under any suitable angle $\alpha$. The antennas are connected in the conventional manner, in a periodic pilgrim step motion, e.g., effected by rotating a capacitively coupled switch to the input of a frequency-modulating receiver, in such a way that there will be effected a quasi continuous transition from antenna to antenna. The ouput waveform at the frequency discriminator of this receiver represents a voltage whose amplitude, corresponding to the rate of frequency deviation of the high-frequency waveform, is in proportion to the sine of the angle of incidence $\alpha$, as long as the spaced relation between the antenna do not exceed the value $\lambda/2$, (which will subsequently be referred to as the "critical point"). Up to this value and also during the apparent movement of the antenna towards the transmitter (the movement of the antenna is simulated by the continuous coupling of each antenna element in the pilgrim step direction) the frequency will increase, but will decrease in the opposite direction. When exceeding the aforementioned "critical point" the conditions will be reversed, in other words, the rate of frequency deviation will decrease again in a mirrored manner, and there will result a rapid phase change of 180°.

Figure 1:
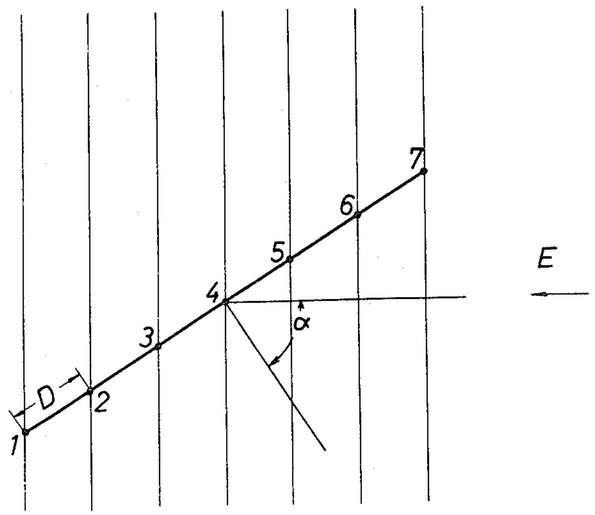
FIG. 1 shows a diagrammatic representation of an antenna array.
Figures 2, 3:
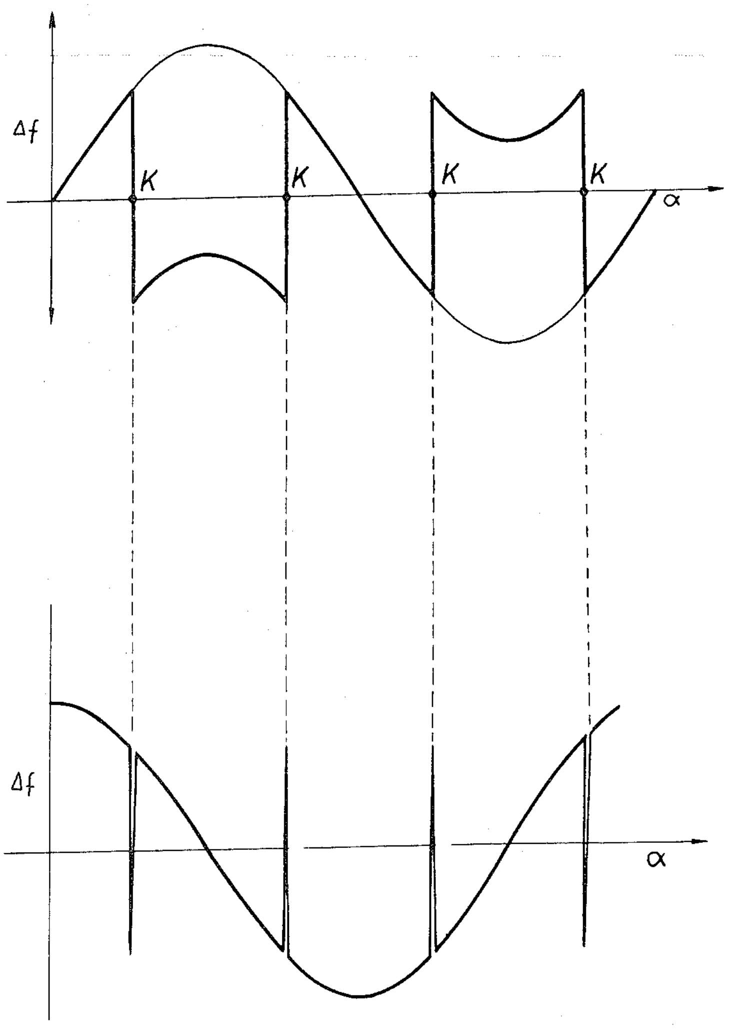
FIG. 2 shows a graphical representation of the frequency versus the angle of incidence of the antenna array of FIG. 1.
FIG. 3 shows a graphical representation of the curve of FIG. 2 after being subjected to differentiation.

The form of the low-frequency waveform with respect to the above described condition is particularly shown in FIG. 2, that is, the frequency variation is shown in relation to the angle of incidence $\alpha$. The jump spots of the function at the critical points K can be clearly recognized. At these points which are indicated by K in FIG. 2, and at which $D \sin \alpha = \lambda/2$, there is effected a phase change of 180°, and the frequency deviation does no longer increase, but is decreased. The curve as shown in this figure is not limited to an antenna array as has been described with reference to FIG. 1, but is just as well applicable to an antenna array in which the antennas are arranged circularly, and are cyclically scanned one at a time in turn. When employing an already existing antenna array with given fixed spaced relations with respect to the individual antennas, and in the case of a correspondingly low receiving frequency or longer wavelength respectviely, at which rapid phase changes of 180° cannot appear at any point, there results a completely normal sine-shaped curve. The evaluation and indication is then effected in the conventional manner by means of a comparison of the phase of this low frequency waveform with a corresponding (locally produced) reference waveform.

If, for example, the curve of FIG. 2 is subjected to a Fourier-analysis, a fundamental wave would be filtered out, which actually would be self-suggesting, then this wavelength would have the opposite sign that the derived curve. With respect to a predetermined frequency, or in other words, for a predetermined antenna spacing of about $0.55\lambda$, it is obvious that the fundamental wavelength would disappear entirely. However, when subjecting the curve 2 according to the invention to an electric differentiation process, then there will result a curve according to FIG. 3, in which the points at which the phases are changed by 180° are denoted by corresponding pulse peaks, but in which the curve as such has a sinusoidal shape, which is absolutely necessary for evaluating the bearing information. These short pulse peaks, existing within the sinusoidal line, do act disturbingly in the course of a subsequently following selective evaluation of the bearing signal.

Figure 4:
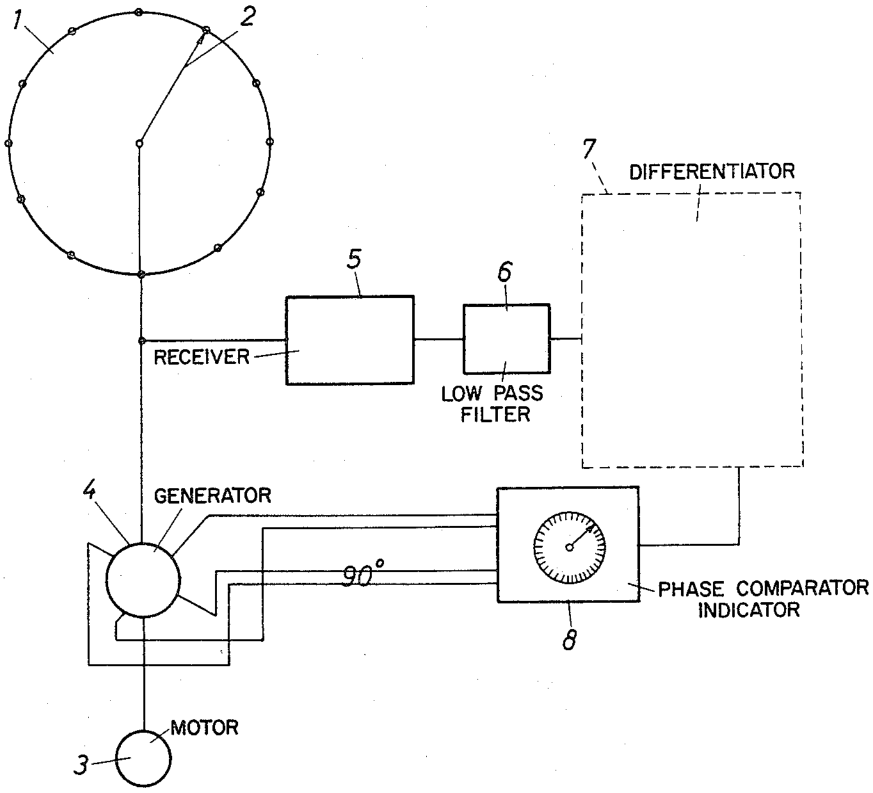
FIG. 4 shows a Doppler-type direction-finder system according to the invention.

One exemplified embodiment of the idea of invention is shown in FIG. 4, in which a circular array of antennas 1 which, in a cyclical succession, are scanned e.g. with the aid of a capacitively coupled switch 2 which is operated by a motor 3. On the same driving shaft of the motor 3 there is arranged the reference waveform generator 4 which, in the conventional manner, delivers two output waveforms, the phase relationship between which is shifted by 90°. Each of these output waveforms are separately fed in the conventional manner to phase-sensitive comparator 8 together with the bearing waveform. The output waveform of this antenna system is fed to the input of a frequency-demodulating receiver 5, whose discriminator output waveform has the shape as shown in FIG. 2. This low-frequency waveform is fed via a low-pass filter 6 to a conventional type of differentiation network 7, the output waveform of which, according to FIG. 3, only has a sine-shaped waveform with pulse peaks atop of it. This waveform, as already mentioned hereinbefore, is fed together with the reference waveforms to a conventional type of phase comparator indicator 8, both of which are constructed in the conventional manner and are combined in one unit, so that the bearing information can be read out immediately.

Figure 5:
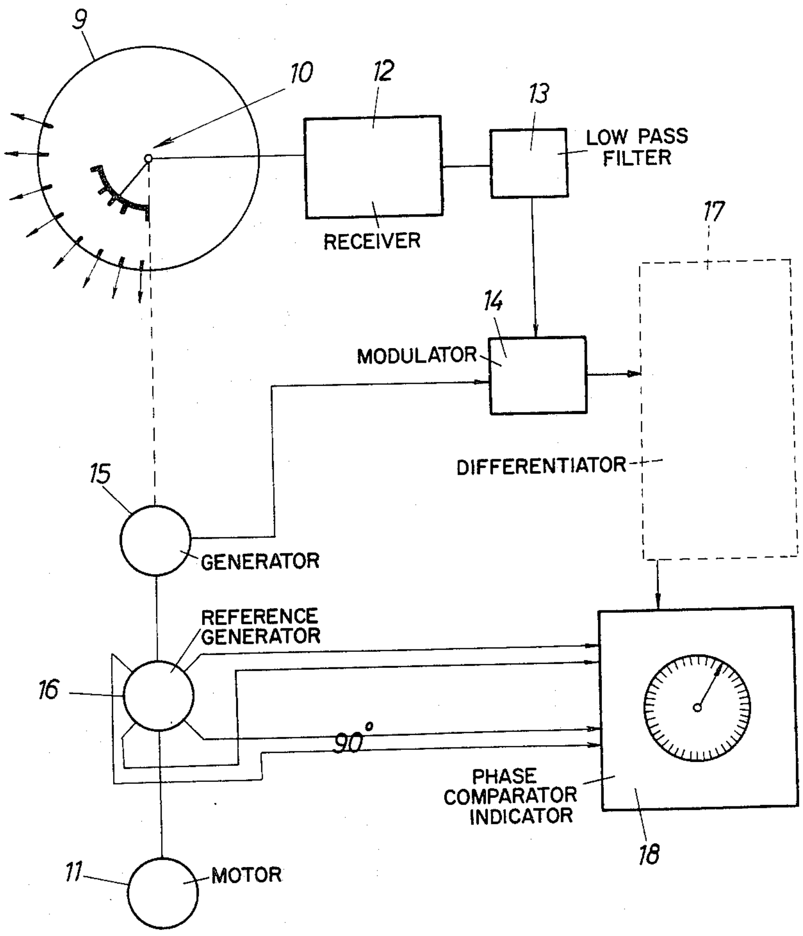
FIG. 5 shows an alternative embodiment of a Doppler-type direction-finder system according to this invnetion.

Of course, the idea of this invention can not only be employed with simple types of direction-finding systems using Doppler's principle, as described hereinbefore, but also with Doppler-type direction-finding systems as have already been described in copending applications of F. Steiner, Serial No. 661,758, filed May 27, 1957 and Serial No. 794,014, filed Feb. 18, 1959, in which the scanning of the circular antenna array consists in the superposition of two virtual motions. Compared with the simple kinds of Doppler-type direction-finders these systems still bear certain advantages. One exemplified embodiment of such a direction-finder is shown in FIG. 5. The antenna array 9 is scanned with the aid of a specially designed capacitively coupled switch 10 which is operated by the motor 11, and which switch permits the performance of an apparent motion of one individual antenna according to a pilgrim-step motion, which has already been discussed in the aforementioned co-pending applications. The frequency-modulated receiving waveform at the output of the switch 10 is fed to a frequency-demodulating receiver 12 whose output waveform is again fed to a modulator arrangement 14 via a low-pass filter 13. To this modulator arrangement 14 there is also fed the waveform of a generator 15 producing a harmonic with respect to a reference waveform generator 16, e.g. 1500 c.p.s. with respect to 50 c.p.s. The waveform containing the bearing information at the output of this modulator arrangement 14 is now subjected, in accordance with the principles of the invention, to a differentiation process in the differentiation network 17 and is then fed, together with the two reference waveforms whose phase relationship is shifted by 90° of the lower scanning frequency (50 c.p.s. from generator 16) to the phase comparator indicator 18, which operates in the already described manner and which will indicate the azimuth.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a direction finding system having a plurality of antennae with a predetermined spacing between every two antennae, a demodulator, means for cyclically coupling the output of said antennae to said demodulator for producing a low frequency wave component, means synchronized with said cyclic coupling means for producing a reference voltage, and a comparator for comparing said low frequency wave to said reference voltage to produce a bearing indication, a device for preventing discontinuity effects in the output of said antennae when a spacing between antennae is greater than one-half wavelength of the received energy comprising in combination a differentiator means coupled between said demodulator and said comparator for applying low frequency wave component to said comparator.

2. A direction finding system comprising a plurality of antennae with a predetermined spacing between every two antennae, a receiver, means for cyclically coupling the output of said antennae to said receiver, means synchronized with said cyclic coupling means for producing a reference voltage, filter means connected to the output of said receiver for converting the output of said receiver to a low frequency wave component, a differentiator circuit coupled to the output of said filter, and a comparator for comparing the low frequency wave from the differentiator to said reference voltage to produce a bearing indication whereby directional indication may be obtained with a spacing between two antennae greater than one-half wavelength of the received energy.

3. A direction finder system as in claim 2 wherein said cyclic coupling means is capacitive.

References Cited in the file of this patent

UNITED STATES PATENTS

| | | |
|---|---|---|
| 2,586,342 | Jarvis | Feb. 19, 1952 |
| 2,651,774 | Earp | Sept. 8, 1953 |